Figures 1, 2:
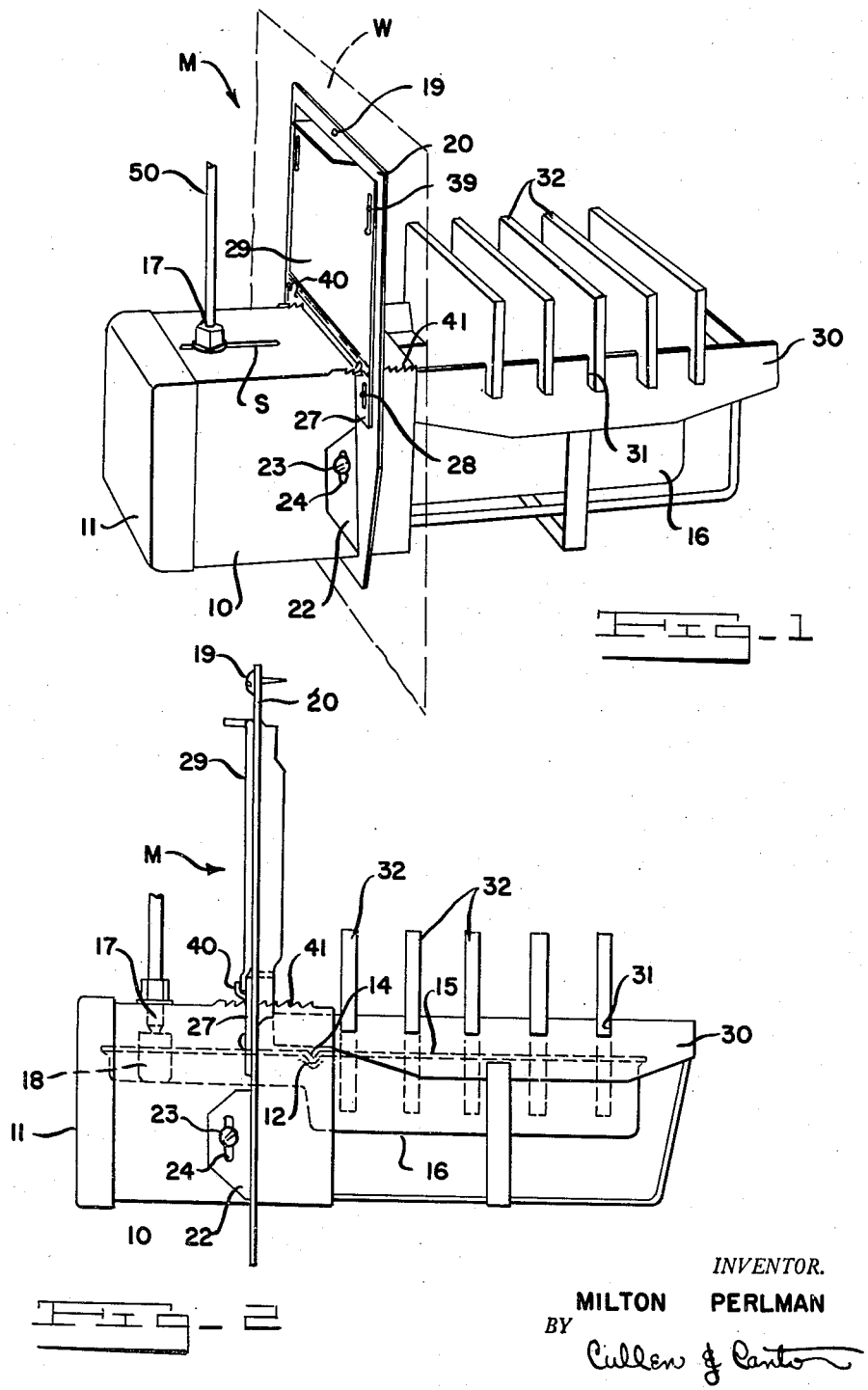

April 22, 1958     M. PERLMAN     2,831,477
HUMIDIFIERS

Filed Feb. 27, 1957     2 Sheets-Sheet 1

*INVENTOR.*
MILTON PERLMAN
BY
ATTORNEYS

April 22, 1958
M. PERLMAN
2,831,477
HUMIDIFIERS
Filed Feb. 27, 1957
2 Sheets-Sheet 2
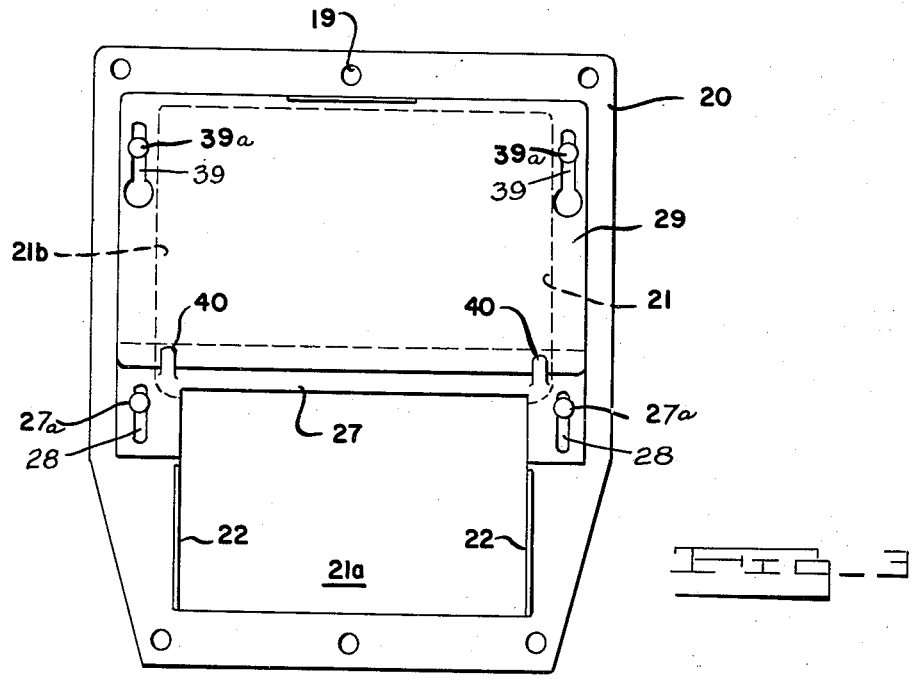
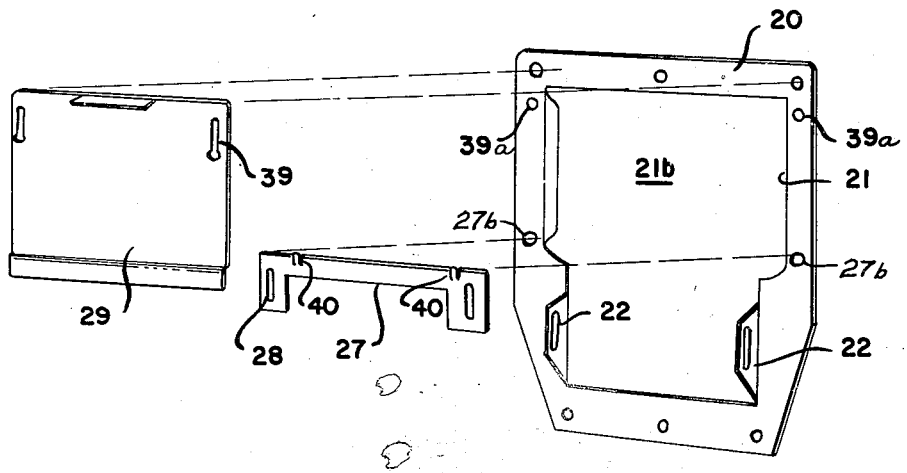
INVENTOR.
MILTON PERLMAN
BY
Cullen & Cantor
ATTORNEYS

United States Patent Office 2,831,477
Patented Apr. 22, 1958

2,831,477
HUMIDIFIERS

Milton Perlman, Detroit, Mich., assignor to Auto-Flo Corporation, Detroit, Mich.

Application February 27, 1957, Serial No. 642,688

1 Claim. (Cl. 126—113)

This application relates to humidifiers, examples of which are shown in my Patents 2,709,427, 2,709,428 and 2,709,429 of May 31, 1955.

A principal object of the present invention is to provide a novel means for mounting a humidifier in a furnace wall which is constructed to provide a double opening in the wall, the lower part of which is occupied by the humidifier body and the upper part of which provides an access and inspection opening above the body.

Another object is to provide a mounting means as above described particularly adapted for use with a humidifier whose body has its forward end formed as a hollow box with its front end open and closed by a removable cover, and with such front opening enabling a water pan of the humidifier to be inserted into and removed from the body through said front opening of the box.

A still further object is to provide a construction according to the foregoing which is adjustable to enable the body to be mounted horizontally regardless of slope or verticality of the furnace wall in which the humidifier is mounted.

Still further objects of the invention will become apparent by reference to the following detailed description taken in connection with the accompanying drawings in which:

Fig. 1 is a perspective view;
Fig. 2 is a longitudinal side elevation view;
Fig. 3 is a view as if from the front;
Fig. 4 is an exploded view of a mounting frame, a locking bar and an access opening cover of a mounting means.

Referring to the drawings, it will be observed that it shows a pan support 10 in the form of a hollow box having open forward and rear ends with the open forward end being closed by a removable snap-on cover 11. The vertical sides of the box are formed with interior lugs 12 whose upper edges provide pivotal bearings for V-shaped formations 14 of the horizontal flange 15 of a water pan or reservoir 16 whereby the latter is removably and pivotally mounted in the support 10 on a horizontal transverse axis between the longitudinally spaced ends of the pan.

At 17 is shown a nozzle of a water supply line 50 connected to the top wall of the support 10 forward of the pivotal axis 12—14, with adjustment permitted by slot S.

The pan 16 tilts and balances itself on is pivot axis 12—14 according to the quantity of water in the pan and to the water pressure at the nozzle 17. When the pan is full, a stopper 18 in the forward end of the pan engages the lower end of the nozzle 17 of the water line to close it. Conversely, when the pan is not adequately filled, water pressure in the line 17 will tilt the pan counterclockwise to open the nozzle and admit water. This is characteristic of the action of a tilting pan humidifier.

The pan is removably mounted within the box support on its pivot axis 12—14 with access into the box support for such purpose being provided by the removal of the snap-on cover 11 closing the forward end of the box.

For facilitating evaporation of water from the water pan 16, there are provided evaporator plates and an evaporator plate support and these will now be described. The evaporator plate support comprises two parallel arms 30 lying over but near the longitudinal edges of the pan 16 and connected to the pan support cantileverwise and extending rearwardly from such support 10. At suitable points along each arm 30 are formed notches 31 in selected ones of which may be disposed T-shaped evaporator plates 32 of suitable evaporator plate material, with the cross bars of the T's resting upon the arms 30 and with the shanks of the T's depending in the pan 16 to dip into the water therein and thus function as evaporators or wicks. The evaporator plates 32 and their supports 30 are out of contact with the pan whereby to permit free tilting of the pan in the pan support 10.

The pan support 10 is a hollow box open at the forward and rear ends and large enough to enable manipulation of the pan 16 for removal from the pan support lugs 12 and for insertion therein through the hollow box support 10.

Mounting means

Having described the foregoing construction which is shown in my prior Patents 2,709,427–429, I now describe the mounting means M which forms the specific feature of the present invention.

The mounting means M for support 10 comprises a mounting frame 20 which is adapted to be secured by screws in holes 19 against a wall W of a furnace or duct and for thus mounting the support 10 in a hole of that wall. Frame 20 is generally square and has a large opening 21, the lower part of which 21a is somewhat smaller than the upper part 21b, with the lower part being dimensioned for snugly receiving the box 10 and for this purpose having lugs 22 connected to the sides of the box by screws 23 in slots 24 of lugs 22 with the sides and top cross bar of the mounting frame 20 extending well above the box 10. A locking bar 27 bridges and is connected to the sides of the mounting frame 20 by screws 27a threading into holes 27b of the mounting frame 20 and passing through locking bar slots 28 and thus clamps the box 10 to the mounting frame 20 for proper mounting of the support 10 in the wall W.

The upper part 21b of the opening in the mounting frame provides an access or inspection opening into the furnace wall in order to give access to the space above the pan and thus give access to the plates for inspection and removal of such plates through the access opening 21b in the mounting frame.

The mounting frame opening 21b is closed by a removable cover 29 adjustably mounted on the sides of the mounting frame by pins 39a of the frame receiving keyhole slots 39 of the cover and with its lower edge interlocking with lugs 40 of the locking bar. Such interlock holds both the locking bar and the inspection opening cover in place.

Slots 24 enable the mounting frame 20 to be tilted with respect to the box 10 on the axis provided by screws 23 and thus permit the mounting frame to be tilted to accommodate itself to a sloping furnace wall W while permitting the box and the pan therein to remain in horizontal position regardless of the slope of such wall.

Saw tooth formations 41 on the upper edges of the box cooperate with the lower edge of the locking bar 27 for interlocking the bar and the box to each other in the adjusted position determined by the tilt of the mounting frame and the slope of the furnace wall.

It will be observed that the box 10 disposed in the lower part of the opening of the mounting frame is clamped in place by the cross-bar so that the box is held tightly in place once mounted and need never be disturbed even while the plates are serviced through the upper access part of the opening. Servicing of the pan and of the water supply line orifice may be provided through the box and thus, in effect all parts may be serviced either through the box or through the upper access opening. The box is permanently mounted in place. The water line is permanently fastened to the box and thereafter the box and the water line need never again be disturbed.

I claim:

A humidifier construction for mounting through and in an opening in a furnace wall comprising a horizontally disposed box having open front and rear ends, a mounting means for said box including a mounting frame having a central opening and a separate locking bar for connecting vertical sides of said frame and adapted to be positioned horizontally to traverse and divide the central opening thereof into substantially separate openings the lower one of which is formed for snugly receiving the forward end of said box, pin and vertical slot means for adjustably and removably mounting and securing the bar at its ends to side portions of said frame enabling the bar to be adjusted vertically on the frame whereby the lower edge of the bar may engage the box in the lower part of the frame and clamp and hold the box immovable in the lower part of the frame, a front closure plate for removably closing the upper opening part of the frame, lugs on the upper edge of the bar overlapping and thus holding the lower edge of the closure plate, pin and vertical slot means for adjustably and removably mounting the closure plate at its side edges to side portions of the frame enabling the closure plate to be adjusted vertically in the frame with its lower edge behind the overlapping lug on the upper edge of the bar.

References Cited in the file of this patent

UNITED STATES PATENTS

| | | |
|---|---|---|
| 2,565,210 | Dovolis | Aug. 21, 1951 |
| 2,709,429 | Perlman | May 31, 1955 |
| 2,749,933 | Perlman | June 12, 1956 |